US008081743B2

(12) United States Patent
Shima et al.

(10) Patent No.: US 8,081,743 B2
(45) Date of Patent: Dec. 20, 2011

(54) SERVER APPARATUS

(75) Inventors: Koji Shima, Sagamihara (JP); Shigeru Fukazawa, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1243 days.

(21) Appl. No.: 11/802,835

(22) Filed: May 25, 2007

(65) Prior Publication Data

US 2007/0286371 A1 Dec. 13, 2007

(30) Foreign Application Priority Data

May 29, 2006 (JP) ................................. 2006-148013

(51) Int. Cl.
*H04M 1/00* (2006.01)
*H04M 3/42* (2006.01)
(52) U.S. Cl. .................. 379/156; 379/164; 379/201.02; 379/245; 709/227
(58) Field of Classification Search ............. 379/90.01, 379/92.03, 92.04, 142.01, 142.04, 142.07, 379/146, 157, 164, 165, 201.02, 242, 245, 379/265.01; 709/204, 206, 227
See application file for complete search history.

(56) References Cited

U.S. PATENT DOCUMENTS

| | | | | |
|---|---|---|---|---|
| 4,794,639 A | * | 12/1988 | Urui et al. | 379/88.19 |
| 4,953,159 A | * | 8/1990 | Hayden et al. | 370/265 |
| 5,742,670 A | * | 4/1998 | Bennett | 379/142.04 |
| 6,195,420 B1 | * | 2/2001 | Tognazzini | 379/130 |
| 6,434,231 B2 | * | 8/2002 | Neyman et al. | 379/265.09 |
| 2008/0097902 A1 | * | 4/2008 | Nishikawa et al. | 705/39 |

FOREIGN PATENT DOCUMENTS

| | | |
|---|---|---|
| EP | 0 721 266 A3 | 7/1996 |
| GB | 2 424 541 | 9/2006 |
| GB | 2 426 891 | 12/2006 |
| GB | 2 426 892 | 12/2006 |
| GB | 2 429 601 | 2/2007 |
| JP | 05-236132 | 9/1993 |
| JP | 06-232975 | 8/1994 |
| JP | 2001-74925 | 3/2001 |
| JP | 2003-274023 | 9/2003 |

* cited by examiner

*Primary Examiner* — Binh Tieu

(74) *Attorney, Agent, or Firm* — Pillsbury Winthrop Shaw Pittman, LLP

(57) ABSTRACT

According to one embodiment, a server apparatus includes a memory which stores a control table respectively showing correspondence relations between user ID of the first data terminal and listener information indicating that the first data terminal is in operation in a pseudo manner, when the first data terminal contained in the call information event is out of operation, and a controller which refers the control table based on the user ID of the first data terminal, when the first data terminal which is out of operation is started, and establishes a communication connection between the first data terminal and the second data terminal based on a reference result.

7 Claims, 8 Drawing Sheets

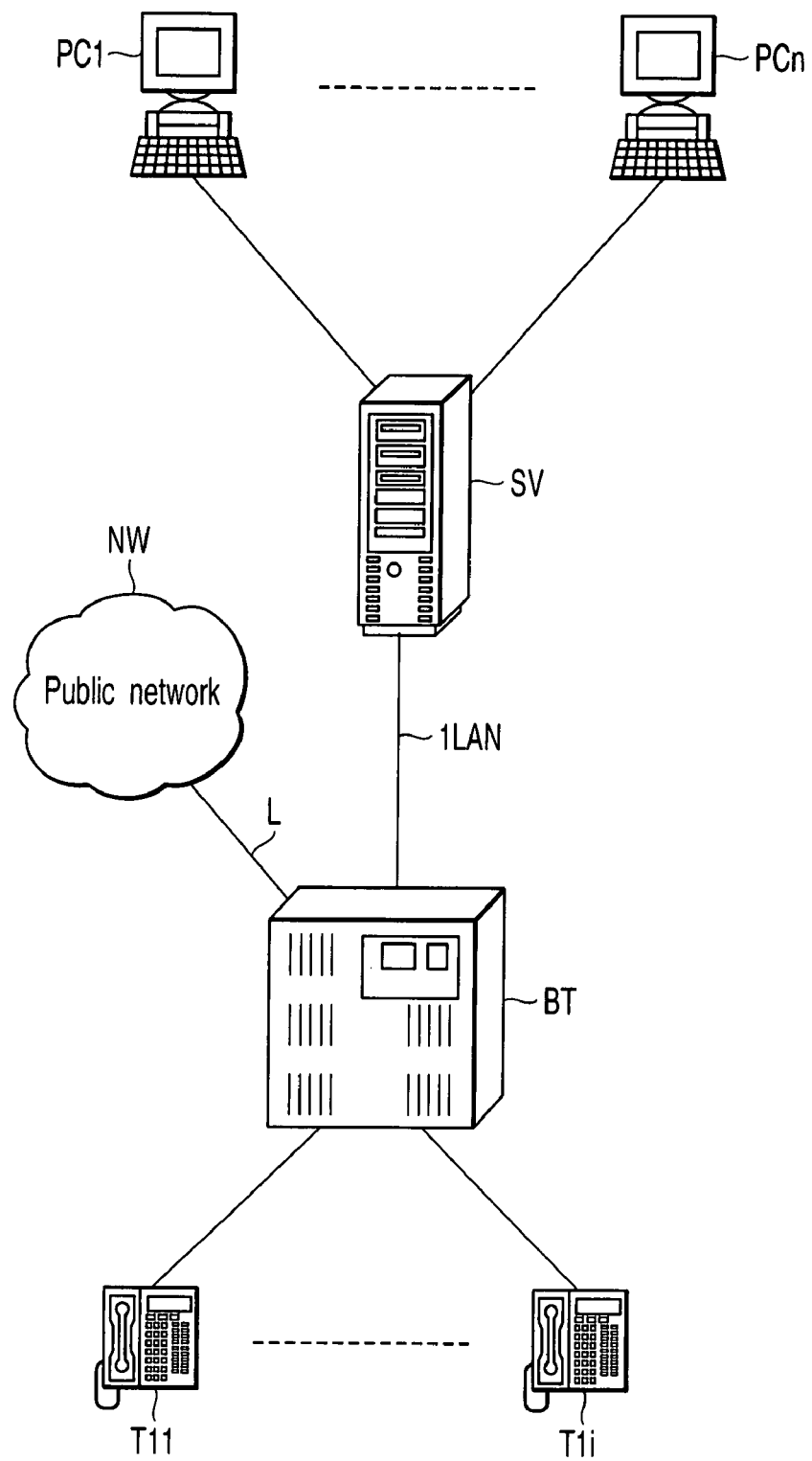
F I G. 1

FIG. 3

| Call group | Extension terminal | Call status |
|---|---|---|
| 1 | T11 | Busy |
| 1 | T12 | Busy |
| 2 | T13 | Reservation |
| 2 | T14 | Busy |
| 3 | T13 | Busy |
| 3 | T15 | Busy |
| 4 | T16 | Busy |
| 4 | T17 | Busy |
| 4 | T18 | Busy |
|  |  |  |

FIG. 4

| Extension terminal | VC | Logon status | Listener registration status |
|---|---|---|---|
| T11 | PC1 | Already logged on | Already registered as listener |
| T12 | PC2 | Already logged off | Already registered as listener |
| T13 | PC3 | Already logged off | Already registered as listener |
| T14 | PC4 | Already logged on | Already registered as listener |
| T15 | PC5 | Already logged on | Already registered as listener |
| T16 | PC6 | Already logged on | Already registered as listener |
| T17 | PC7 | Already logged off | Already registered as listener |
| T18 | PC8 | Already logged off | Already registered as listener |
|  |  |  |  |

FIG. 5

| Session | VC list | |
|---|---|---|
| Session 1 | PC1 | PC2 |
| Session 2 | PC4 | PC5 |
|  |  |  |

SERVER APPARATUS

CROSS-REFERENCE TO RELATED APPLICATIONS

This application is based upon and claims the benefit of priority from Japanese Patent Application No. 2006-148013, filed May 29, 2006, the entire contents of which are incorporated herein by reference.

BACKGROUND

1. Field

One embodiment of the present invention relates to improvements in server apparatus in visual communication systems in which, for example, the server apparatus are connected to telephone exchange apparatuses via communication paths to allow video signals, computer data, and the like to be handled in addition to sound signals.

2. Description of the Related Art

Local network systems are used in offices and business establishments. The local network system accommodates telephone sets as extension terminals in a telephone exchange apparatus such as a private branch exchange (PBX) or a key telephone apparatus. The extension terminals are exchangeably connected to an external communication network such as a public network and extension terminals are exchangeably connected together, by the telephone exchange apparatus to enable calls.

Video conference systems have been proposed which connect a server to which data terminals such as personal computers are connected, to a telephone exchange apparatus via transmission paths.

For the video conference system, a technique has also been proposed by which a telephone exchange apparatus performs control on the basis of a control table containing integrated call connection information on immediate call connections and reserved call connections between terminals involved in the conference to controllably connect target terminals (for example, Jpn. Pat. Appln. KOKAI Publication No. H5-236132).

However, this system is not applicable to VCSs (Visual Communication Systems) in which data communication connections among data terminals are linked to the call statuses of telephone terminals.

Further, to realize VCS, the following measures need to be considered.

To allow a VCS server to correctly perform video communication control on data terminals when, for example, a two-party call is to be made such that visual clients associated with extension terminals involved in the two-party call make video communications with each other, the visual clients must perform a log-on operation on the VCS server before they can make a call (listener registration).

That is, it is assumed that a two-party call is started with one of the visual clients associated with the extension terminals for the two-party call, in a log-on status and the other in a log-off status. Then, the VCS server receives a call information event (outgoing DN, incoming DN) transmitted by a telephone exchange apparatus. However, since one of the visual clients is in the log-off status, the connection status between the extension terminals based on the received information is not registered in the call connection information table in the VCS server. Subsequently, if the logged off visual client performs a log-on operation, then at this timing of the log-on operation, the VCS server does not receive the call information event (outgoing DN, incoming DN). No information associating the two parties with each other is present in the call connection information table in the VCS server. Thus, no video communication is started even with the logon statuses of both visual clients associated with the extensions for the two-party call.

It is possible to pre-register all visual clients registered in VCS as listeners regardless of whether or not the visual clients associated with extension terminals are in the log-on status. However, with this method, when, for example, 500 visual clients are already registered in VCS, even if only 100 visual clients are in the log-on status, the 500 visual clients are always registered as listeners, always imposing a heavy system load on the VCS server. This makes the operation of the VCS server unstable.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a schematic diagram showing the configuration of a visual communication system in accordance with a first embodiment of the present invention;

FIG. 3 is a diagram showing an example of contents stored in a connection information control table shown in FIG. 2;

FIG. 4 is a diagram showing an example of contents stored in an extension terminal-VC association table shown in FIG. 2;

FIG. 5 is a diagram showing an example of contents stored in a session information control table shown in FIG. 2;

DETAILED DESCRIPTION

Various embodiments according to the invention will be described hereinafter with reference to the accompanying drawings. In general, according to one embodiment of the invention, a server apparatus which receives a call information event containing telephone IDs specifying a first telephone terminal and second telephone terminal to be call-connected, and makes communication connections of a first data terminal and a second data terminal work together with the call connections, the first and second data terminals being associated with the telephone IDs of the first and second telephone terminals, respectively, and the first and second data terminals being assigned user IDs, the server apparatus comprising: a memory which stores a control table respectively showing correspondence relations between user ID of the first data terminal and listener information indicating that the first data terminal is in operation in a pseudo manner, when the first data terminal contained in the call information event is out of operation; and a controller which refers the control table based on the user ID of the first data terminal, when the first data terminal which is out of operation is started, and establishes a communication connection between the first data terminal and the second data terminal based on a reference result.

First Embodiment

FIG. 1 is a schematic diagram showing the configuration of a visual communication system in accordance with a first embodiment of the present invention.

As shown in the figure, the system comprises a main apparatus BT, a VCS (Visual Communication System) server SV, and LAN (Local Area Network) 1 that connects the main apparatus BT to the VCS server SV.

The main apparatus BT accommodates extension terminals T11 to T1$i$ via extensions. The main apparatus BT is connected to a public network NW via a local line L. The main apparatus BT executes an exchange process between any of the extension terminals T11 to T1$i$ or between any of the extension terminals T11 to T1$i$ and the public network NW.

The VCS server SV accommodates a plurality of data terminals PC1 to PCn via an IP network. The data terminals PC1 to PCn comprise general purpose personal computers and operate in association with the extension terminals T11 to T1$i$, respectively.

The VCS server SV performs additional functions for the main apparatus BT to process media information, for example, videos.

Figure 2:
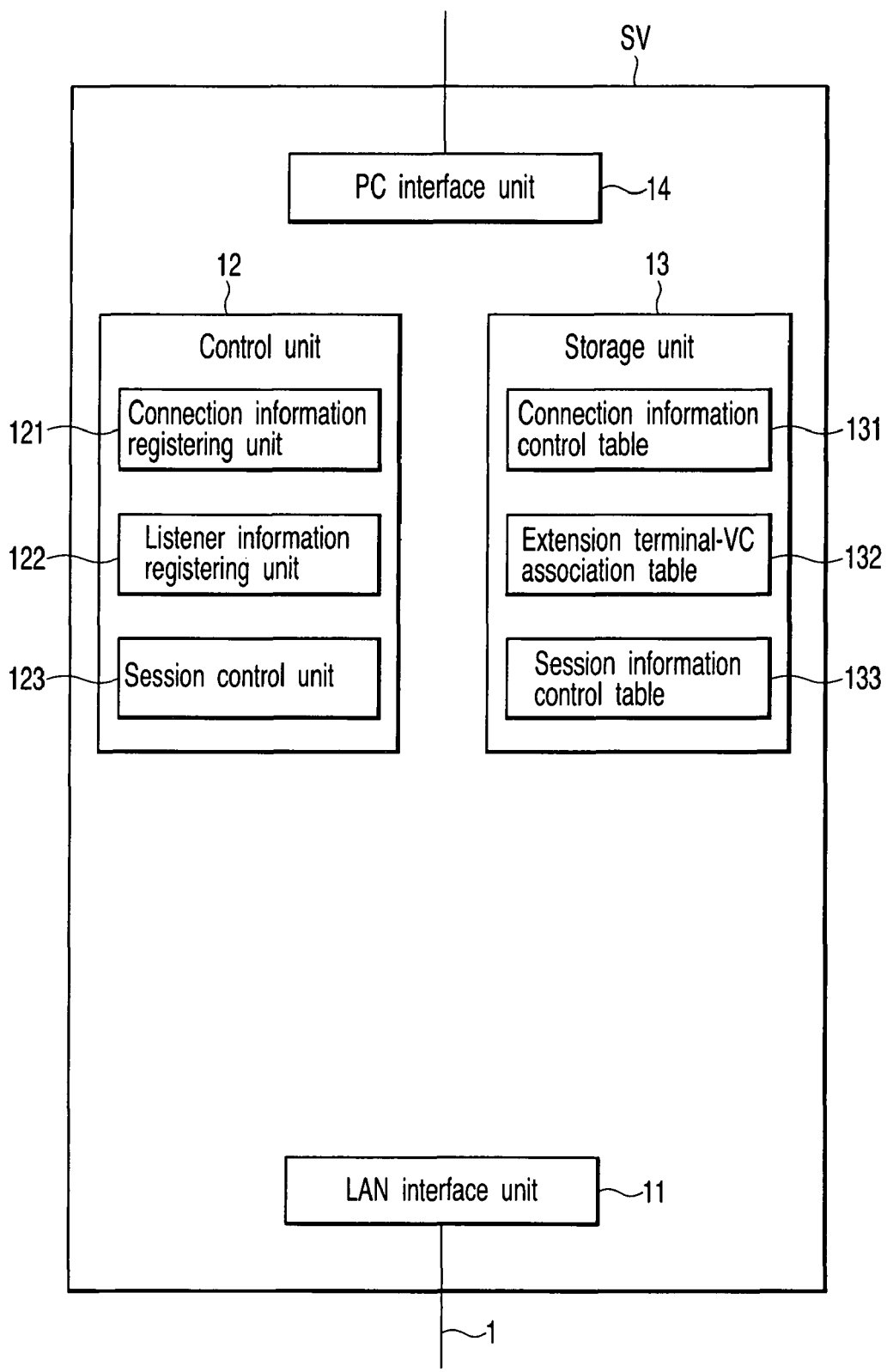
FIG. 2 is a block diagram showing the configuration of the functions of a VCS server shown in FIG. 1.

FIG. 2 is a block diagram showing the configuration of the functions of the VCS server SV.

The VCS server SV comprises a LAN interface unit 11, a control unit 12, a storage unit 13, and a PC interface unit 14. The LAN interface unit 11 interfaces with LAN 1.

The PC interface unit 14 interfaces with the data terminals PC1 to PCn.

The storage unit 13 stores routing information or the like which is required for connection control performed by the control unit 12. The storage unit 13 also has a connection information control table 131 (hereinafter referred to as a control table 131), an extension terminal-VC (Visual Client) association table 132 (hereinafter referred to as a table 132), and a session information control table 133 (hereinafter referred to as a control table 133).

As shown in FIG. 3, the control table 131 stores information (telephone IDs) indicative of the extension terminals T11 to T1$i$, call group numbers (connection IDs) specifying call connections among the extension terminals T11 to T1$i$, and data indicative of correspondences between the above information and information indicative of a call status. For simplification of description, the figure shows the extension terminals T11 to T18.

As shown in FIG. 4, the table 132 stores the correspondences between the extension terminals T11 to T1$i$ and data terminals (VC) PC1 to PCn, and information indicating whether or not the terminal is in the log-on status (the terminal is in operation), and information indicating whether or not the terminal has been registered as a listener. For simplification of description, the figure shows only the extension terminals T11 to T18 and the data terminals PC1 to PC8. A data terminal registered as a listener is considered by the VCS server SV in a pseudo manner to be in a log-on status even if it is in the log-off status (it is out of operation).

As shown in FIG. 5, the control table 133 stores information indicative of the session status between the data terminals PC1 to PC8.

On the other hand, the control unit 12 provides not only a control function for the status control of the data terminals PC1 to PCn and the cooperation between the data terminals PC1 to PCn and the extension terminals T11 to T1$i$ but also a new function in accordance with the present invention corresponding to a connection information registering unit 121 (hereinafter referred to as a registering unit 121), a listener information registering unit 122 (hereinafter referred to as a registering unit 122), and a session control unit 123.

The registering unit 121 analyzes a call information event communicated by the main apparatus BT to, for example, determine that the extension terminals T11 and T12 have started communication. The registering unit 121 records information indicative of the extension terminals T11 and T12 and a call status "busy" in the control table 131 in association with a call group number "1".

The registering unit 122 records "already logged off" and "already registered as listener" in association with information (user ID) indicative of the data terminal PC2 in the table 132, when the data terminals PC1 and PC2 are associated with the extension terminals T11 and T12, respectively, and the data terminal PC2 is in the log-off state. The registering unit 122 records "already logged on" and "already registered as listener" in association with information indicative of the data terminal PC1 in the extension terminal-VC association table 132.

The session control unit 123 determines that the extension terminal T11 is associated with the data terminal PC1 and that the extension terminal T12 is associated with the data terminal PC2 based on the table 132. The session control unit 123 retrieves the session statuses of the data terminals PC1 and PC2 from the control table 133. For example, if a call is to be started, the data terminals PC1 and PC2 have not started a session yet, so that the session control unit 123 references the table 132 to determine that the data terminals PC1 and PC2 are in a "already registered as listener" status. The session control unit 123 performs control such that the session between the data terminals PC1 and PC2 is started when the data terminal PC2 logs on. Once the session between the data terminals PC1 and PC2 is established, the session control unit 122 updates the contents stored in the control table 133.

When the call between the extension between the extension terminals T11 and T12 is disconnected, the session control unit 123 deletes "already registered as listener" corresponding to the data terminals PC1 and PC2 from the table 132 and information on the data terminals PC1 and PC2 from the control table 133.

Now, description will be given of the operation of the visual communication system configured as described above.

Figure 6:
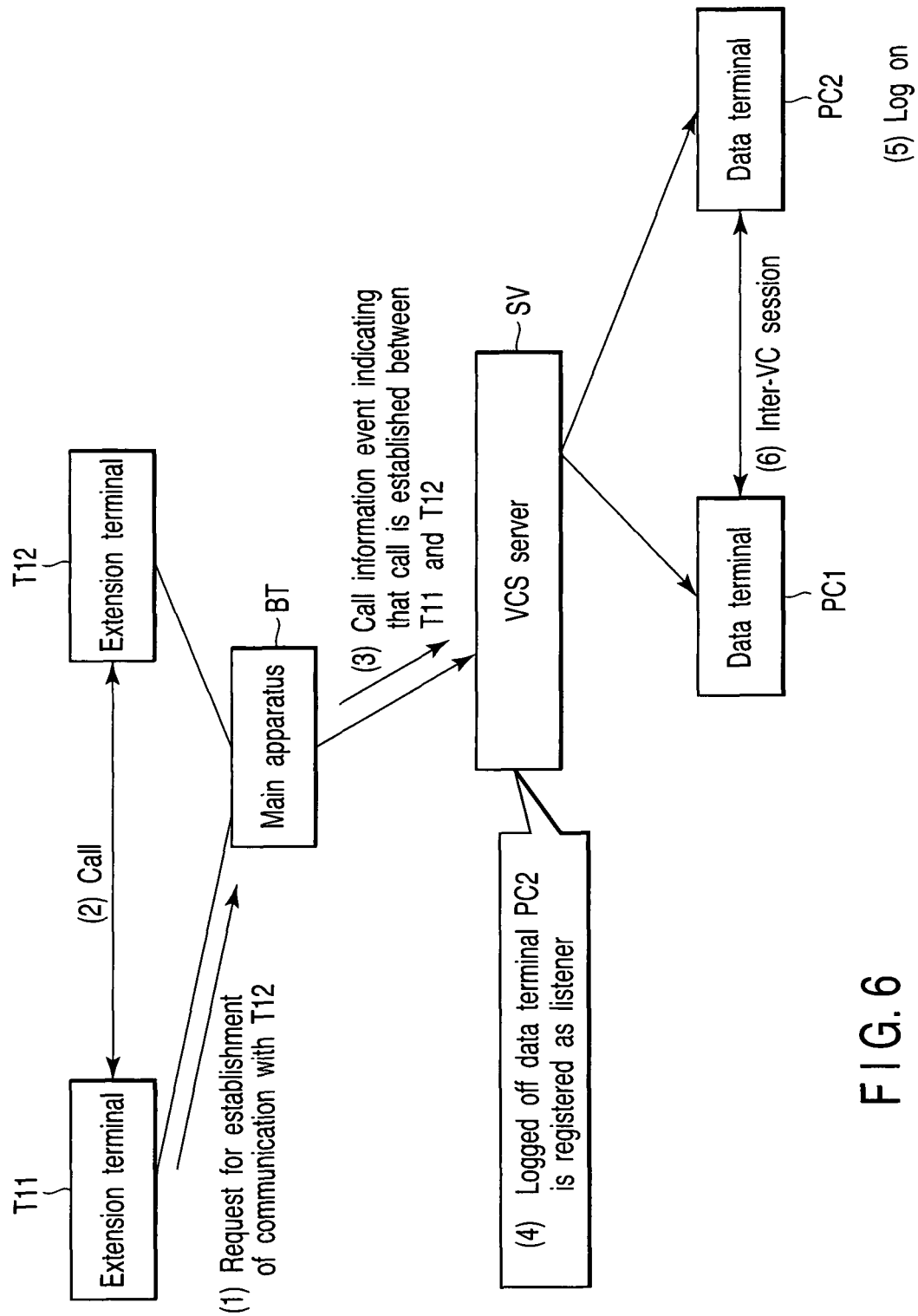
FIG. 6 is a schematic sequence diagram showing information transmitting and receiving operations performed between extension terminals and a main apparatus and a VCS server and data terminals when visual communication control is performed, in accordance with the first embodiment of the present invention.
Figure 7:
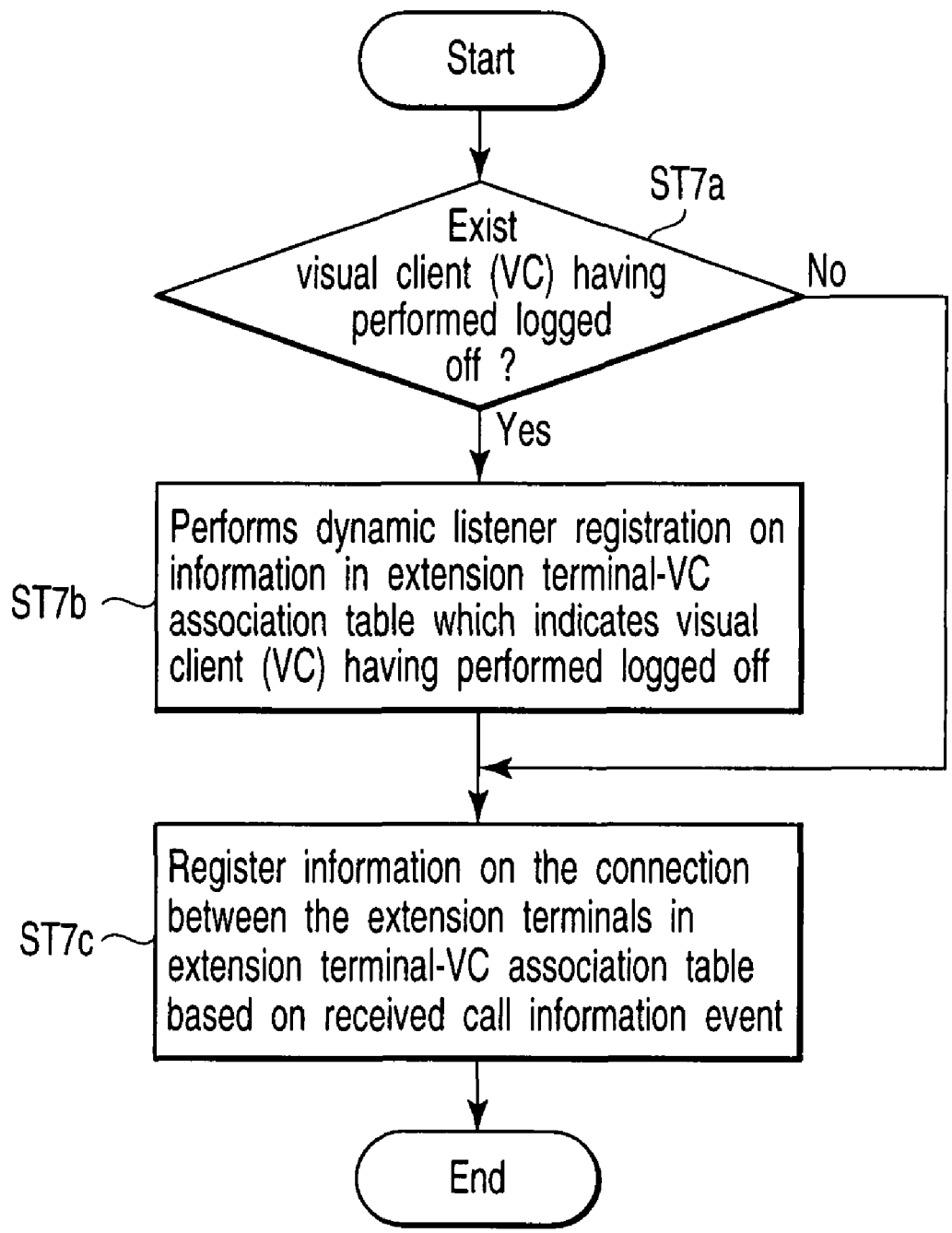
FIG. 7 is a flowchart showing a control process procedure executed by a VCS server when a logged off data terminal is registered as a listener, in accordance with the first embodiment of the present invention.

FIG. 6 is a sequence diagram showing operations performed when a call is made between the extension terminals T11 and T12 and if a session is to be established between the data terminals PC1 and PC2, associated with the extension terminals T11 and T12. FIG. 7 is a flowchart showing the procedure of a control process executed by the VCS server SV in this case.

For example, it is assumed that the user at the extension terminal T11 performs an operation for requesting a call to the extension terminal T12 (FIG. 6(1)). Then, the extension terminal T11 sends the request signal to the main apparatus BT. Upon receiving the communication establishment request signal, the main apparatus BT calls the receiving extension terminal T12. Then, when the extension terminal T12 responds to the signal, the main apparatus BT forms a communication link between the extension terminals T11 and T12 (FIG. 6(2)). The main apparatus BT then transmits a call information event to the VCS server SV which indicates that a call is established between the extension terminals T11 and T12 (FIG. 6(3)).

Upon receiving the call information event, the VCS server SV references the table 132 to determine whether or not one of the data terminals PC1 and PC2, associated with the extension terminals T11 and T12 has already logged off (block ST7a).

Here, the data terminal PC2 has already logged off. The VCS server SV thus performs dynamic listener registration on information in the table 132 which indicates the data terminal PC2 (the VCS server updates the listener registration status to a "already registered as listener" status) (block ST7b). The VCS server SV registers information on the connection between the extension terminals T11 and T12 in the control table 131 based on the received call information event (block ST7c).

In the above block ST7a, if both data terminals PC1 and PC2 have already logged on, the VCS server SV retrieves the session status between the data terminals PC1 and PC2 from the information in the control table 133. If no session has been started, the VCS server SV performs control such that the data terminals PC1 and PC2 start a session.

Figure 8:
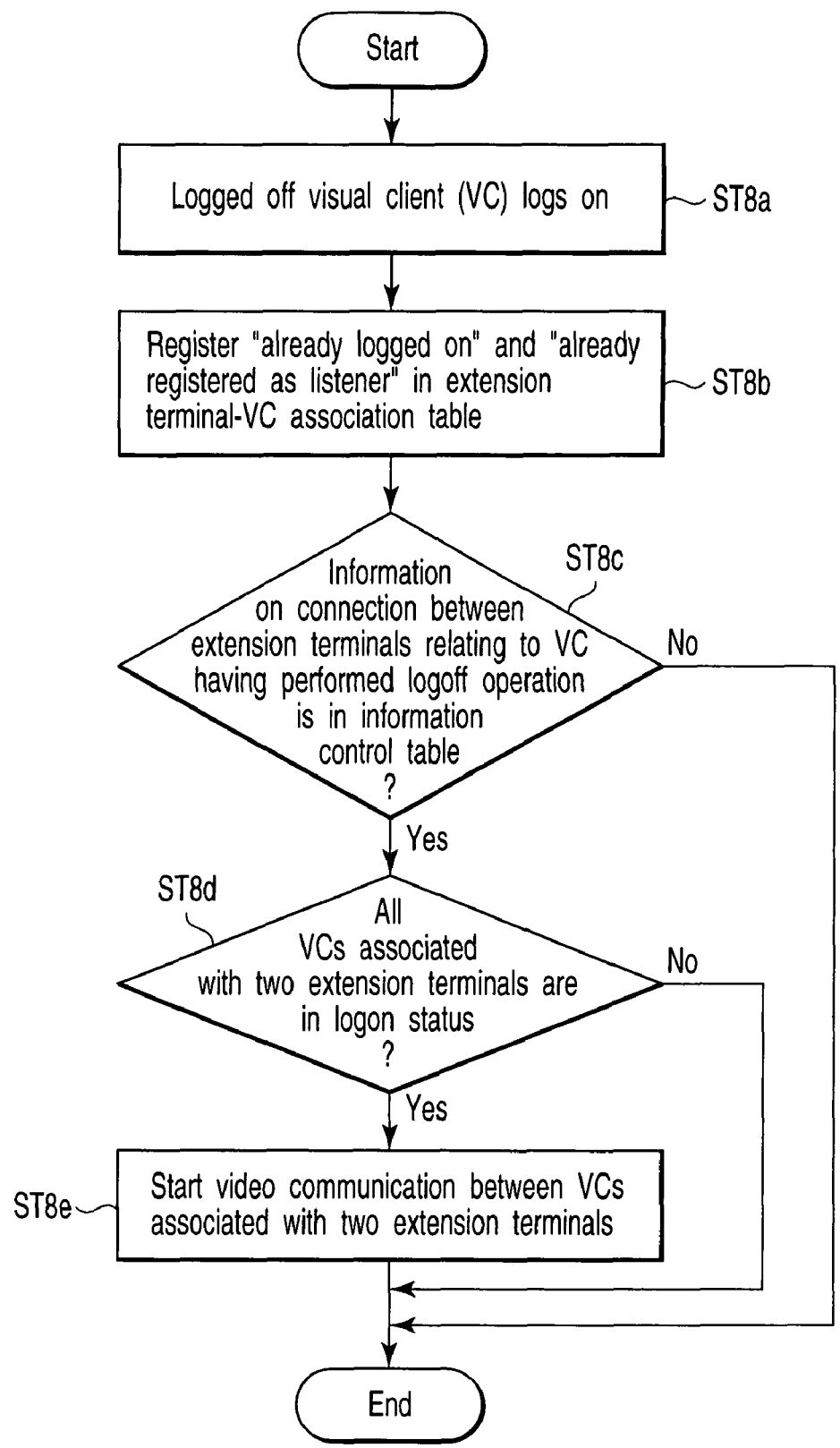
FIG. 8 is a flowchart showing a control process procedure executed by the VCS server when during a two-party call, the logged off data terminal logs on, in accordance with the first embodiment of the present invention.

FIG. 8 is a flowchart showing the procedure of a control process executed by the VCS server SV when the logged off data terminal PC2 logs on during a two-party call.

For example, it is assumed that with a call established between the extension terminals T11 and T12, a user performs a log-on operation at the logged off data terminal PC2 (FIG. 6(5)). Then, the VCS server SV shifts from block ST8a to block ST8b to update the log-on status of the data terminal PC2 in the table 132 to "already logged on" and the listener registration status to "already registered as listener". The VCS server SV determines whether or not the control table 131 contains information on the connection between the extension terminals T11 and T12 which relates to the data terminal PC2 (block ST8c).

If the control table 131 contains no information on the connection between the extension terminals T11 and T12 which relates to the data terminal PC2, then the VCS server SV immediately ends the process.

On the other hand, if the control table 131 contains information on the connection between the extension terminals T11 and T12 which relates to the data terminal PC2, the VCS server SV references the table 132 to determine whether or not both data terminals PC1 and PC2, associated with the two extension terminals T11 and T12, are in the log-on status (block ST8d).

If not both data terminals PC1 and PC2 are in the log-on status, the VCS server SV immediately ends the process.

On the other hand, if both data terminals PC1 and PC2 are in the log-on status, the VCS server SV starts the video communication between the data terminals PC1 and PC2, associated with the two extension terminals T11 and T12 (block ST8e), the VCS server SV determines that the extension terminal T11 is associated with the data terminal PC1 and that the extension terminal T12 is associated with the data terminal PC2 based on the data 132. The VCS server SV then retrieves the session status of the data terminals PC1 and PC2 from the information in the control table 133. If no session is started, the VCS server SV performs control such that a session is started between the data terminals PC1 and PC2.

As described above, in the first embodiment, when the VCS server SV receives a call information event and if the data terminals PC1 and PC2 are associated with the telephone IDs of the extension terminals T11 and T12, respectively, contained in the call information event and the data terminal PC2 is in the log-off status, then the VCS server SV records the user ID of the data terminal PC2, information indicative of the "log-off status", and "already registered as listener" in the table 132 in association with one another. When the data terminal PC2 shifts from the log-off status to the logon status, the VCS server SV references the table 132 to determine whether or not the data terminal PC2 is in the "already registered as listener" status. If the data terminal PC2 is in the "already registered as listener" status, the VCS server SV establishes a session between the data terminals PC1 and PC2.

Accordingly, even if the data terminals PC1 and PC2 are associated with the extension terminals T11 and T12, respectively, between which a call connection is to be made and the data terminal PC2 is in the log-off status, a session can be immediately established between the data terminals PC1 and PC2 when the data terminal PC2 shifts to the log-on status. Further, listener registration is dynamically performed, eliminating the need to register all the data terminals PC1 to PCn as listeners. This enables a reduction in processing load on the VCS server SV.

Furthermore, in the first embodiment, the VCS server SV records the user ID of the data terminal PC2, information indicative of the "log-off status", and "already registered as listener" in the table 132 in association with one another. The VCS server VS further records information indicating that a call has been established between the extension terminals T11 and T12, in the control table 131. Then, when the logged off data terminal PC2 shifts to the logon status, the VCS server SV, before establishing a session between the data terminals PC1 and PC2, uses information on call connections between the extension terminals T11 and T12, controllably accumulated in the control table 131, to determined whether or not to be able to establish a session between the data terminals PC1 and PC2.

Therefore, only if a call connection is established between the extension terminals T11 and T12, a session can be established between the data terminals PC1 and PC2, associated the extension terminals T11 and T12. This makes it possible to further improve the reliability with which sessions are established.

Second Embodiment

Figure 9:
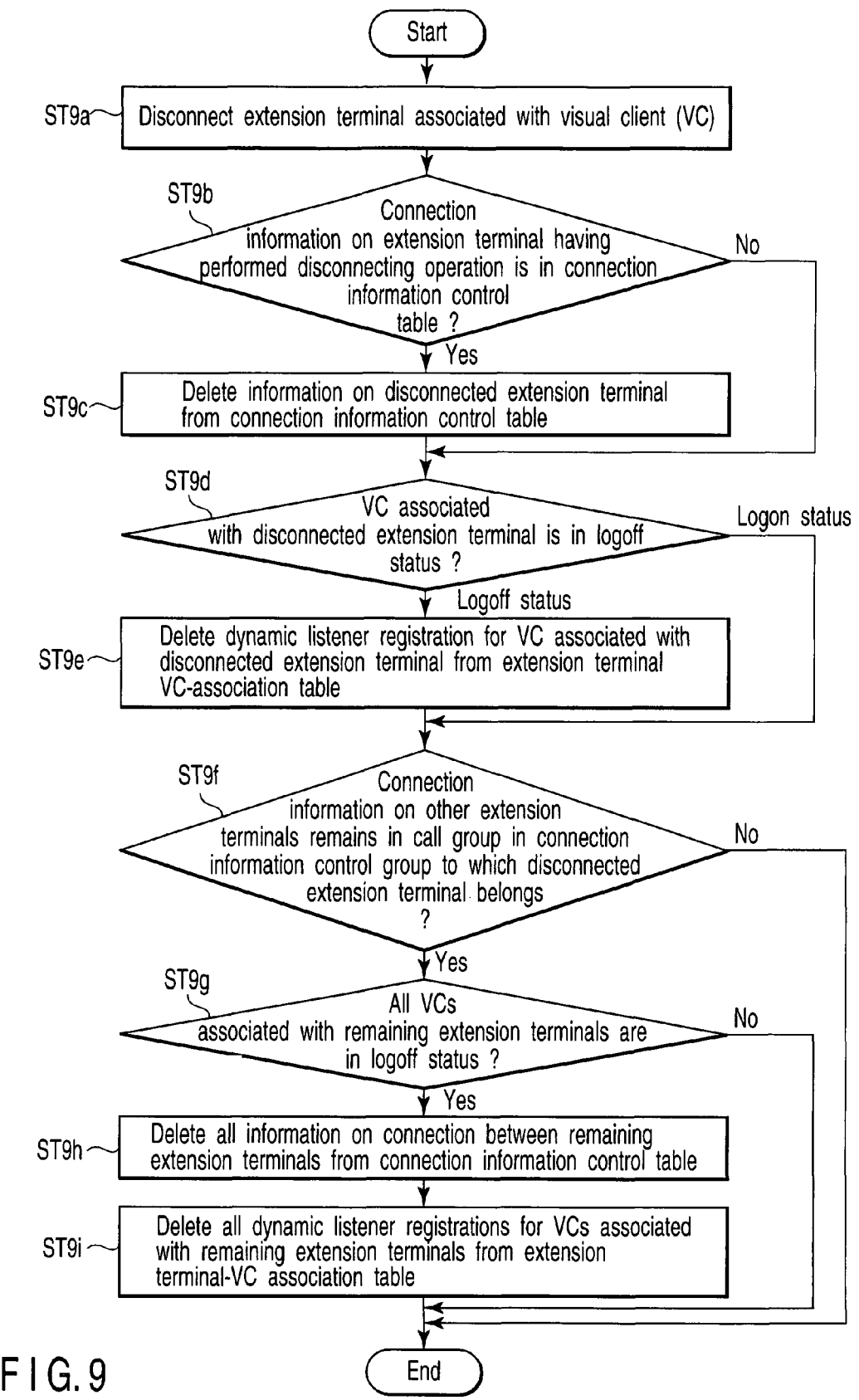
FIG. 9 is a flowchart showing a control process procedure executed by the VCS server when during a three-party conference, one of three extension terminals performs a disconnecting operation, in accordance with a second embodiment of the present invention.

FIG. 9 is a flowchart showing the procedure of a control process executed by the VCS server SV when extension terminals T16, T17, and T18 are in a three-party conference status and if the extension terminal T16 performs a disconnecting operation.

For example, it is assumed that the extension terminals T16, T17, and T18 are holding a three-party conference. In this state, it is further assumed that the user at the extension terminal T16 performs a disconnecting operation. Then, the main apparatus BT sends a call information event indicating that the extension terminal T16 has performed a disconnecting operation, to the VCS server SV.

Upon receiving the call information event, the VCS server SV shifts from block ST9a to block ST9b to determine whether or not the control table 131 contains any information on the connection between the extension terminals T17 and T18 which relates to the extension terminal T16, which has performed a disconnecting operation.

Here, the control table 131 contains information on the connection between the extension terminals T17 and T18 which relates to the extension terminal T16. The VCS server SV thus deletes the information on the extension terminal T16 from the control table 131 (block ST9c). The VCS server SV then references the table 132 to determine whether or not the data terminal PC6, associated with the extension terminal T16, is in the log-off status (block ST9d).

If the data terminal PC6 is in the log-off status, the VCS server SV deletes a dynamic listener registration for the data terminal PC6, associated with the extension terminal T16, from the table 132 (updates the listener registration status to "listener being canceled") (block ST9e). The VCS server SV then determines whether or not the control table 131 contains any connection information on the other extension terminals T17 and T18 in a call group to which the extension terminal T16 belongs (block ST9f).

If no connection information on the other extension terminals remains in the call group to which the extension terminal T16 belongs, the VCS server SV immediately ends the process.

On the other hand, if any connection information on the other extension terminals T17 and T18 remains in the call group to which the extension terminal T16 belongs, the VCS server SV determines whether or not both data terminals PC7 and PC8, associated with the remaining extension terminals T17 and T18, are in the log-off status (block ST9g).

If not both data terminals PC7 and PC8, associated with the remaining extension terminals T17 and T18, are in the log-off status, the VCS server SV immediately ends the process.

On the other hand, if both data terminals PC7 and PC8, associated with the remaining extension terminals T17 and T18, are in the log-off status, the VCS server SV deletes all the remaining information on the connection between the extension terminals T17 and T18 from the control table 131 (block ST9h). The VCS server SV further deletes, from the table 132, all the dynamic listener registrations for the data terminals PC7 and PC8, associated with the remaining extension terminals T17 and T18 (updates the listener registration status to "canceling listener") (block ST9i).

In the above block ST9b, if the control table 131 contains no information on the connection between the extension terminals T17 and T18 which relates to the extension terminal T16, the VCS server SV shifts to the processing in the above block ST9d.

Further, in the above block ST9d, if the data terminal PC6 associated with the extension terminal T16, which has performed a disconnecting operation, is in the log-on status, the VCS server SV shifts to the processing in the above block ST9f.

As described above, if a conference connection is made between the extension terminals T16, T17, and T18 and the extension terminal T16 subsequently performs a disconnecting operation, with information on the call connection between the extension terminals T17 and T18 remaining in the same call group in the control table 131, then the information on the extension terminals T17 and T18 is deleted from the control table 131 and the listener registration information on the data terminals PC7 and PC8 is deleted from the table 132 if both data terminals PC7 and PC8, associated with the extension terminals T17 and T18, are in the logoff status.

This makes it possible to prevent the unwanted use of the control table 131 and the table 132, allowing the effective utilization of the control table 131 and the table 132.

The control information accumulated in the control table 131 and table 132 can always be automatically updated to the latest information without requiring a maintenance manager for the VCS server SV to execute a manual update process.

Third Embodiment

Figure 10:
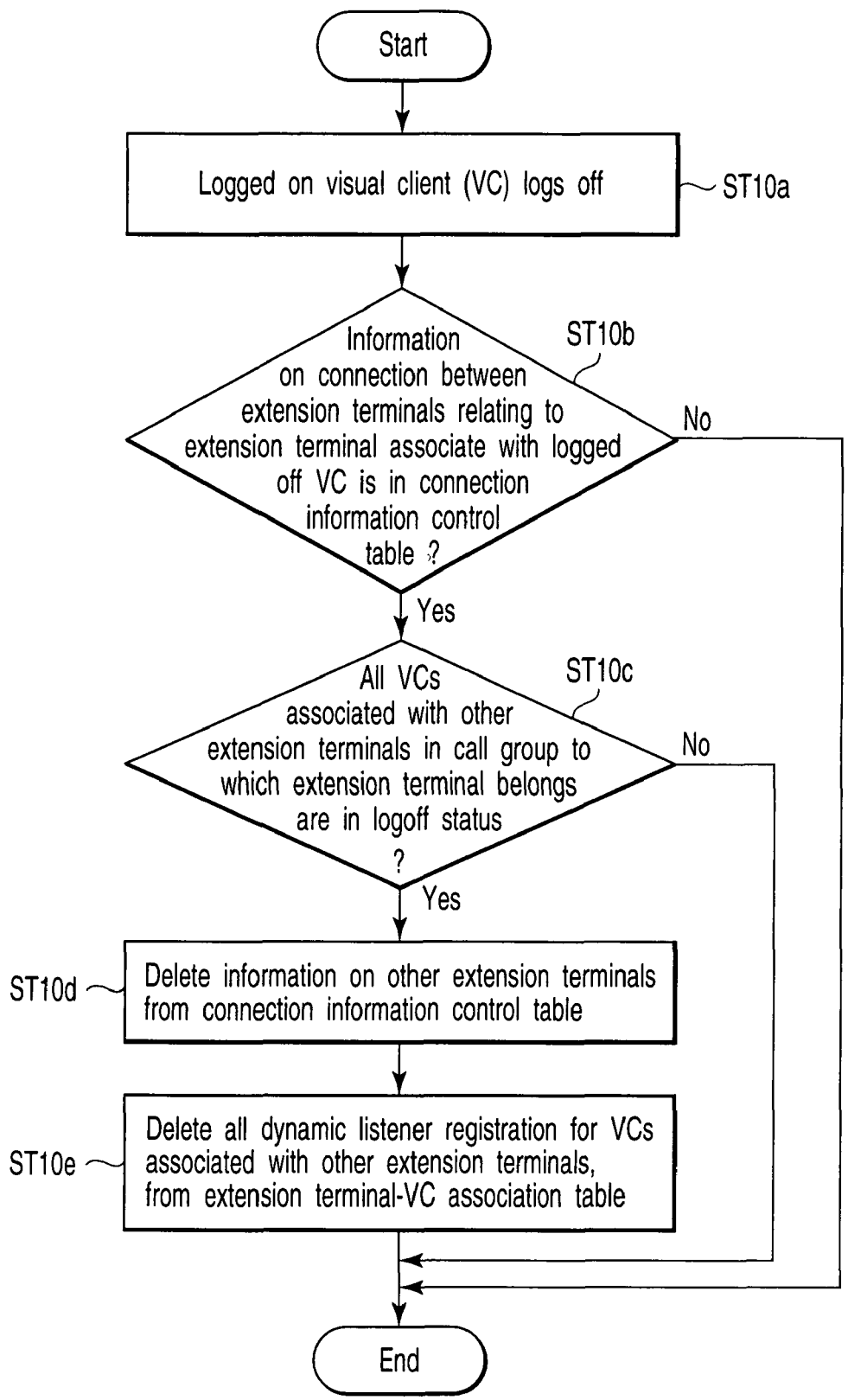
FIG. 10 is a flowchart showing a control process procedure executed by the VCS server when during a two-party call, a logged on data terminal logs off, in accordance with a third embodiment of the present invention.

FIG. 10 is a flowchart showing the procedure of a control process executed by the VCS server SV if the logged on data terminal PC1 logs off during a two-party call.

For example, it is assumed with a call established between the extension terminals T11 and T12, the user at the logged on data terminal PC1 performs a log-off operation. Then, the VCS server SV shifts from block ST10a to block ST10b to determine whether or not the control table 131 contains any information on the connection between the extension terminals which relates to the extension terminal T11, associated with the data terminal PC1 (block ST10b).

If the control table 131 contains no information on the connection between the extension terminals which relates to the extension terminal T11, associated with the data terminal PC1, the VCS server SV immediately ends the process.

On the other hand, if the control table 131 contains information on the connection between the extension terminals which relates to the extension terminal T11, associated with the data terminal PC1, then the VCS server SV determines whether or not the data terminal PC2, associated with the other extension terminal T12 in the call group to which the extension terminal T11 belongs, is in the log-off status (block ST10c).

If the data terminal PC2 is not in the log-off status, the VCS server SV immediately ends the process.

On the other hand, if the data terminal PC2 is in the log-off status, the VCS server SV deletes all the information on the other extension terminal T12 from the control table 131 (block ST10d). The VCS server SV further deletes, from the table 132, all the dynamic listener registration for the data terminal PC2, associated with the extension terminal T12 (updates the listener registration status to "listener being cancelled) (block ST10e).

Thus, like the above second embodiment, the third embodiment makes it possible to prevent the unwanted use of the control table 131 and the table 132, allowing the effective utilization of the control table 131 and the table 132.

Other Embodiments

The present invention is not limited to the above embodiments. For example, when a call transfer is to be performed, even if only the data terminal associated with the extension terminal finally remaining for a two-party call is in the logon status and an extension terminal (transfer host) that is to perform a transfer operation is in the logoff status, the VCS server, upon receiving a call information event (outgoing DN, incoming DN) transmitted by a telephone exchange apparatus, performs dynamic listener registration in spite of the logoff status of one of the data terminals to register information on the connection between the extension terminals in the connection information control table. Consequently, operations are performed which are similar to those performed when the data terminals associated with all the extension terminals involved in the transfer are in the logon status. This enables a video communication between the data terminals associated with the two finally remaining extension terminals.

The above embodiments describe the example in which if one of the plurality of data terminals to be associated with each other is in the logoff status, "already registered as listener" is recorded in the extension terminal-VC association table in association with information indicative of "log-on" or "log-off". However, the present is not limited to this, only the logged off data terminal may be registered in the extension terminal-VC association table as a listener.

The above embodiments describe the example in which the main apparatus and the VCS server are separately provided. However, the functions of the main apparatus may be incorporated into the VCS server.

Further, variations may be made to the configuration and type of the VCS server, the type of the telephone exchange apparatus (which is not limited to the main apparatus but may be PBX), the type of the extension terminals, the type of the data terminals, the contents stored in the tables, the method for controlling a session between the data terminals, the method for registering a listener, the method for deleting a listener registration, and the like without departing from the spirit of the present invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as world fall within the scope and spirit of the inventions.

What is claimed is:

1. A server apparatus which receives a call information event containing telephone IDs specifying a first telephone terminal and second telephone terminal to be call-connected, and makes communication connections of a first data terminal and a second data terminal work together with the call connections, the first and second data terminals being associated with the telephone IDs of the first and second telephone terminals, respectively, and the first and second data terminals being assigned user IDs, the server apparatus comprising:
    a memory which stores a control table respectively showing correspondence relations between user ID of the first data terminal and listener information indicating that the first data terminal is in operation in a pseudo manner, when the first data terminal contained in the call information event is out of operation; and
    a controller which refers the control table based on the user ID of the first data terminal, when the first data terminal which is out of operation is started, and establishes a communication connection between the first data terminal and the second data terminal based on a reference result.

2. The server apparatus according to claim 1, further comprising:
    a connection information memory which stores a connection information table respectively showing correspondence relations between the telephone IDs of the first telephone terminal and the second telephone terminal and status information indicative of the call connection status between the first and second telephone terminals, in response to the received call information event,
    wherein the controller refers the control table and the connection information table based on the user ID of the first data terminal and the telephone ID associated with the user ID, when the first data terminal which is out of operation is started, and establishes a communication connection between the first data terminal and the second data terminal based on the reference result.

3. The server apparatus according to claim 2, wherein the controller deletes status information corresponding to the first and second telephone terminals from the connection information table, when the call between the first and second telephone terminals is disconnected, and deletes status information corresponding to the first and second telephone terminals from the connection information table, when the first data terminal is out of operation.

4. The server apparatus according to claim 2, when the server apparatus receives a call information event on a connection request from a third telephone terminal different from the first and second telephone terminals,
    wherein the connection information memory stores a connection information table respectively showing correspondence relations between connection IDs specifying call connections between the first and second and third telephone terminals and status information indicative of the call connection status between the first and second and third telephone terminals, and
    when the call between the first and second telephone terminals is disconnected and a third data terminal associated with the remaining third telephone terminal is out of operation,
    the controller deletes a connection ID to which the first and second telephone terminals belong and the status information from the connection information table, and deletes all listener information corresponding to the user IDs of the first and third data terminals from the control table.

5. The server apparatus according to claim 4, wherein the controller deletes a connection ID to which the second and third telephone terminals belong and the status information from the connection information table, and deletes all listener information corresponding to the user IDs of the first and third data terminals from the control table, when the second data terminal changes from an operative status to an inoperative status and the first and third data terminals are out of operation.

6. The server apparatus according to claim 1, wherein the memory stores a control table respectively showing correspondence relations between the user ID of the second data terminal and listener information indicating that the second data terminal is in operation in a pseudo manner, when the server apparatus receives a call information event indicating that the second telephone terminal has transferred communication to the third telephone terminal and the second data terminal associated with the second telephone terminal is out of operation, and
    the controller establishes a communication connection between the first and third data terminals based on listener information which corresponds to the user ID of the second data terminal in the control table.

7. The server apparatus according to claim 1, further comprising an interface which connects a telephone exchange apparatus, the telephone exchange apparatus executes an exchange process between a plurality of telephone terminals and generates call information event containing telephone IDs specifying a first telephone terminal and second telephone terminal to be call-connected,
    wherein the memory stores the control table, in response to the received call information event from the telephone exchange apparatus.

* * * * *